US010783773B2

(12) United States Patent
Fossier et al.

(10) Patent No.: US 10,783,773 B2
(45) Date of Patent: *Sep. 22, 2020

(54) FORKLIFT ACTIVATED PROJECTOR

(71) Applicants: David A. Fossier, Cincinnati, OH (US); William Chemick, Cincinnati, OH (US)

(72) Inventors: David A. Fossier, Cincinnati, OH (US); William Chemick, Cincinnati, OH (US)

(*) Notice: Subject to any disclaimer, the term of this patent is extended or adjusted under 35 U.S.C. 154(b) by 212 days.

This patent is subject to a terminal disclaimer.

(21) Appl. No.: 15/735,864

(22) PCT Filed: Jun. 16, 2016

(86) PCT No.: PCT/US2016/037890
§ 371 (c)(1),
(2) Date: Dec. 12, 2017

(87) PCT Pub. No.: WO2016/205530
PCT Pub. Date: Dec. 22, 2016

(65) Prior Publication Data
US 2020/0035090 A1    Jan. 30, 2020

Related U.S. Application Data

(60) Provisional application No. 62/180,275, filed on Jun. 16, 2015.

(51) Int. Cl.
G08G 1/005     (2006.01)
B66F 9/075     (2006.01)
G01V 8/00      (2006.01)
G08G 1/16      (2006.01)

(52) U.S. Cl.
CPC .......... *G08G 1/005* (2013.01); *B66F 9/0755* (2013.01); *G01V 8/005* (2013.01); *G08G 1/166* (2013.01)

(58) Field of Classification Search
CPC combination set(s) only.
See application file for complete search history.

(56) References Cited

U.S. PATENT DOCUMENTS 2,920,185 A * 1/1960 Conrad ................ B60Q 1/2611
                                                    362/501
4,779,176 A   10/1988 Bornhorst
5,367,349 A   11/1994 Zeiler
5,572,202 A   11/1996 Regel et al.
(Continued)

OTHER PUBLICATIONS

Domes & Mirrors by Se-Kure Brochure (May 14, 2003).
(Continued)

*Primary Examiner* — Nabil H Syed
*Assistant Examiner* — Cal J Eustaquio
(74) *Attorney, Agent, or Firm* — John B. Woodward; Jon L. Woodward; Woodward International Law

(57) ABSTRACT

An apparatus detects and warns pedestrians of traffic approaching an intersection. The apparatus includes multiple unitary sensors for detecting traffic, each unitary sensor being capable of detecting a pedestrian and a moving metal object such as a forklift. The unitary sensors use microwaves to detect moving metal objects and, in some embodiments can also use microwaves to detect pedestrians. Each of the unitary sensors has an activatable pedestrian mode that, when activated, allows the unitary sensor to sense and detect the presence of pedestrians.

45 Claims, 7 Drawing Sheets

(56) References Cited

U.S. PATENT DOCUMENTS

| | | | |
|---|---|---|---|
| 7,086,750 | B2 | 8/2006 | Leyden et al. |
| 7,423,522 | B2 | 9/2008 | O'Brien et al. |
| 7,699,141 | B2 | 4/2010 | Fossier et al. |
| 8,768,559 | B1 | 7/2014 | Murphy |
| 8,905,568 | B2 | 12/2014 | Fossier et al. |
| 9,384,660 | B2 | 4/2016 | Fossier et al. |
| 2002/0175825 | A1 | 11/2002 | Clerk et al. |
| 2006/0071766 | A1 | 6/2006 | O'Brien et al. |
| 2006/0133072 | A1 | 6/2006 | Leyden et al. |
| 2014/0204347 | A1 | 7/2014 | Murphy |
| 2015/0154863 | A1* | 6/2015 | Fossier .................... G09F 9/33 340/907 |

OTHER PUBLICATIONS

Alert Safety Products Forklift Warning Systems Brochure (2013).
Alert Safety Products Product/Service Information Brochure (2012).
Internet Brochure for LTBL Tech LIGHTCOP Radar-Controlled Traffic Management and Warning System (visited Oct. 13, 2015) <http://www.ltbltech.com/>.
Internet Web Page for QUNOMIC Virtual Technologies (visited Oct. 13, 2015) <http://steingroup.us/qunomic/index.php>.
Internet Web Page for SIGNCAST Virtual Signs (visited Oct. 13, 2015) <http://www.creativesafetysupply.com/signcast-virtual-signs/>.
Internet Web Page for Shure Star Traffic Caution System (visited Oct. 18, 2016) <http://shurestar.com/traffic-caution-systems/>.
Internet Web Page for The Original Light Cop User Manual (visited Dec. 11, 2017) <http://www.ltbltech.com/lightcop-safety-sign-projector/>.
Internet Web Page for collision Awareness Sensor Alert Warning System (visited Oct. 18, 2016) <http://safety-products.save-ty.com/category/collision-awareness-look-outs>.

* cited by examiner

FORKLIFT ACTIVATED PROJECTOR

BACKGROUND

When forklifts are used in an industrial environment such as a factory or a warehouse situation, they usually occupy a space that is populated not only with forklifts but with other moving things as well. These can comprise a wide variety of moving objects such as powered and unpowered utility carts, bicycles, golf carts and people. Wherever there are moving objects such as these, there is always a danger of collision between them. Particularly severe collisions can happen when the moving objects are massive, such as when forklifts collide, and injuries can occur if a person is involved in a collision.

The danger of collisions is manifest at intersections, such as those that include a pedestrian walkway, and especially on a factory or warehouse floor, when views are inhibited by items adjacent the intersections that obscure oncoming traffic approaching the intersections.

Prior art for warning of or seeing approaching traffic at intersections has included traffic signals, various mirror arrangements for observing traffic, floor embedded sensors for triggering warnings, auditory warning systems, and sensors distributed around the areas of approach to intersections. These have been used to trigger various warning devices from signs to whistles.

Installation of these systems is often expensive and time consuming. The installation usually requires significant wiring over a plurality of approaches and a central control unit with the wiring often subject to damage in the industrial environment. In addition the distributed sensors on which they depend are easily blocked or damaged due to their distribution around the area of the intersection with some of them necessarily disposed at low levels where they can easily be hit or damaged by activities occurring in the industrial environment.

A reliable and robust apparatus for detecting and warning of the presence of traffic that approaches the intersection outside the line of sight of one approaching the intersection is needed. This system should be able to detect and distinguish between the kind of traffic that is approaching the intersection, the sizes of objects approaching the intersection, and various properties of the objects approaching such as composition. The system should also be capable of being selectively responsive to different types of traffic, such as pedestrian versus vehicle. The apparatus should further be able to distinguish whether the traffic is approaching or departing the intersection. The apparatus should then be able to warn of the approach of objects that might be out of the line of sight of one approaching the intersection. It is also advantageous if the apparatus can account for travel velocities and/or positions of the other approaching traffic.

It is also advantageous if the apparatus is easily installable by having closely positioned components requiring less time or skill on the part of the installer. It is also desirable if the apparatus allows for the projection of warning information to surfaces or locations separated from the apparatus.

The apparatus should offer direct visual identification of the traffic approaching the intersection. This would be best accomplished by providing projected information regarding the approaching traffic in addition to a warning even if the intersection comprises acute, right, or obtuse angles between intersecting pathways.

SUMMARY

An apparatus detects and warns pedestrian traffic of traffic; approaching at an intersection. The apparatus includes a sensing system having multiple unitary sensors for detecting traffic approaching an intersection. A controller, having a power supply, is responsive to the unitary sensors. Each of the unitary sensors are capable of detecting a pedestrian and a moving metal object such as a forklift. The unitary sensors use microwaves to detect moving metal objects and, in some embodiments can also use microwaves to detect pedestrians.

Each of the unitary sensors has an activatable pedestrian mode that, when activated, allows the unitary sensor to sense and detect the presence of pedestrians as well as moving metal objects. The unitary sensors use microwaves to detect the presence of the moving metal objects in sensor detection areas, and in some contemplated embodiments also use microwaves to detect the presence of pedestrians. When one of the unitary sensors detects the presence of a metal object in a metal detection area moving toward the intersection, the controller of the sensing system causes the projector to project a warning signal into the floor, ground, or other surface in or near the intersection that is visible to pedestrians walking toward the intersection. In some contemplated embodiments, the controller does not cause the projector to project the warning signal when the metal objects are moving in a direction that is away from the intersection.

In some contemplated embodiments, the pedestrian detection area and metal detection area of each sensor can partially or completely overlap, or in other contemplated embodiments, only slightly overlap or be entirely without any overlapping coverage area. In most contemplated embodiments, the unitary sensors are not responsive to pedestrians entering the pedestrian detection areas if their pedestrian detection modes are not activated.

The projected message can be a fixed position, blinking, or circular rotating message. In some contemplated embodiments, an additional warning is also projected to indicate from which direction the forklift or massive object is approaching the intersection, while in other contemplated embodiments, a remotely positioned additional warning device can also be illuminated based on the sensor system detections of the unitary sensors.

BRIEF DESCRIPTION OF THE DRAWINGS

For a more complete understanding and appreciation of this invention, and many of its advantages, reference will be made to the following detailed description taken in conjunction with, the accompanying drawings, wherein.

DETAILED DESCRIPTION

Figure 1:
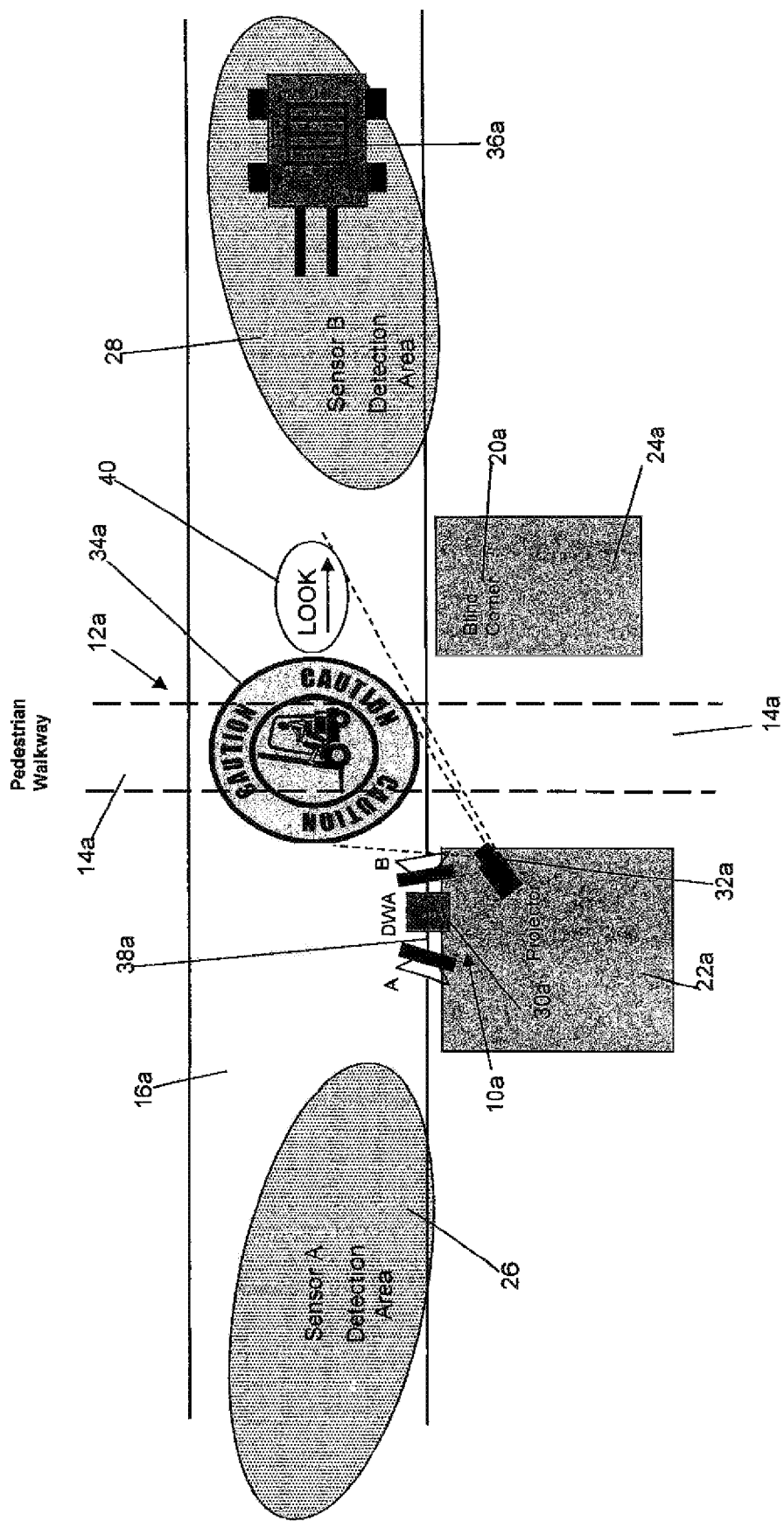
FIG. 1 is a top view diagram of a four-way intersection in which one embodiment of the invention is utilized to provide warning information to pedestrians approaching an intersection.

Referring to the drawings, some reference numerals are used to designate the same or corresponding parts through several of the embodiments and figures shown and described. Variations in corresponding, parts are denoted in specific embodiments with the addition of lowercase letters. Subsequent variations in components that are depicted in the figures hut not described are intended to correspond to the specific embodiments mentioned earlier and are discussed to the extent that they vary in form or function. It will be understood generally that variations in the embodiments could be interchanged without deviating from the intended scope of the invention.

FIG. 1 depicts an apparatus 10a of the invention that is positioned to detect and warn pedestrians approaching and crossing an industrial pathway 16a at an intersection 12a via a pedestrian walkway 14a, through which large metal objects pass, in this example a forklift 36a. A blind corner 20a is created by obstacles 22a and 24a adjacent the intersection 12a.

The apparatus 10a includes a left-looking unitary sensor A for detecting traffic entering into the sensor A detection area 26 and a right-looking unitary sensor 13 for detecting traffic entering into the sensor B detection area 28. The apparatus 10a also includes a sensing system having a controller 30a and further includes a projector 32a. The unitary sensors A and B use microwaves to detect and are responsive to the presence of a forklift 36a or other massive metal vehicle moving into the sensor A or B detection areas in a direction toward the intersection 12a but are not responsive to such forklifts or massive metal objects moving away from the intersection 12a.

The controller 30a, having a power supply (not shown in FIG. 1), controls the operation of the projector 32a based on whether one or both of the unitary sensors A and B detects the presence of a forklift 36a or other massive object moving toward the intersection 12a. The controller 30a can be any suitable logic system having the ability to operate the projector 32a based on the responsive logic output of the unitary sensors A and B. One example of an appropriately implemented controller includes the DWA-MW2 Directional Worker Alert (DWA), Controller, and Power Supply available from Alert Safety Products, Inc. of Cincinnati, Ohio. The projector 32a can be any suitable projector having the ability to project visible messages on, remote surfaces, such as the floor of the intersection 12a, based on the logic or control output of the projector 32a. A variety of commercially available projectors can perform this function and may operate at different distances from the projection surface to project in various background colors and ambient lighting conditions. One such appropriately implemented projector is the ES-LED40D Gobo projector, 40W LED with 10 degree lens, available from GoboSource of Scotts Valley, Calif.

The microwave sensors A and B both include pedestrian detection modes that, when activated, allow the unitary sensors A and B to also detect the presence of pedestrians in the sensor A and detection areas 26 and 28. It is contemplated that, depending on the operational characteristics of the particular unitary sensor used, microwaves or other detection technologies or techniques could be used by the unitary sensors A and B to detect pedestrians within the contemplated, scope of the invention.

In this contemplated embodiment of FIG. 1, the sensor A and B detection areas 26 and 28 along the industrial aisle or pathway 16a are overlapping metal detection areas, where the unitary sensors A and B detect metal objects moving toward the intersection 12a, and pedestrian detection areas, where the unitary sensors A and B detect pedestrians walking along the pathway 16a when the sensors A and B have their pedestrian detection modes activated.

When a forklift or other massive object enters one of the sensor A or B coverage areas 26 or 28 and is detected by a unitary sensor. A or B as traveling toward the intersection 12a, the sensing system, via the controller 30a causes the projector 32a to project a warning signal 34a on to the floor of the intersection 12a such that the signal 34a is visible to pedestrians entering or approaching the intersection 12a from the pedestrian walkway 14a or from an opposite direction of the pathway 16a. The signal 34a may also be visible to other forklift and/or industrial equipment operators approaching from an opposite direction of the pathway 16a. The signal 34a, in some contemplated embodiments of the invention, may be projected on to other surfaces such as a wall, ceiling, window, or adjacent surface such as those of the obstacles 22a and 24a.

The signal 34a may itself be customized with hazard or site specific information, may blink or rotate, or have other attention grabbing, lighting, graphical, or informational attributes. In some embodiments, the signal 34a may change partially or completely due to sensed information detected by the sensors A and/or B and be processed and evaluated by the controller 30a.

For example, consider the forklift 36a entering into the sensor B coverage area 28 and, as shown in FIG. 1, traveling in a direction toward the intersection 12a. In this depicted example, the controller 30a sensors A and B, and projector 32a, are positioned 10 to 20 feet from the floor of the intersection 12a on an adjacent wall 38a. The right-looking unitary sensor B detects the massive, metallic forklift 36a as traveling toward the intersection 12a and, in response, the controller 30a causes the projector 32a to project the warning signal 34a. In this example of FIG. 1, the warning signal is circular and can be round, illuminated to a yellow, red, or orange attention grabbing color, and may be rotating.

In some contemplated embodiments, a right-pointing secondary arrow signal 40a, which can also be rotating and also include a message such as the exclamation "LOOK!" can also be projected into the intersection 12a to alert approaching individuals of the direction from which the forklift 36a is also approaching. Were the forklift 36a to instead approach the intersection 12a from the left through the sensor A coverage area 26a such that it was instead detected by the left-looking unitary sensor A, the sensing system, via the controller 30a, could cause the projector 32a to project a left-pointing secondary arrow signal (not shown) based on the opposite direction of approach by the forklift 36a.

The sensing system, via the controller 30a, does not cause the projector 32a to project the warning signal 34 when a pedestrian, or possibly a less massive metallic object or non-metallic object enters the sensor A or B detection areas 26 or 28 unless the respective unitary sensor A or B has its pedestrian detection mode activated. However, if the pedestrian detection mode is activated for either unitary sensor A or B, the sensing system responds by causing the projector 32a to project the warning signal 34a into the intersection 12a. It is further contemplated that in some embodiments, the sensing system may differentiate between a detected pedestrian and moving metal object by changing the projected signal to reflect, with identifying information contained in the signal itself, the nature of the object entering the intersection.

Figure 2:
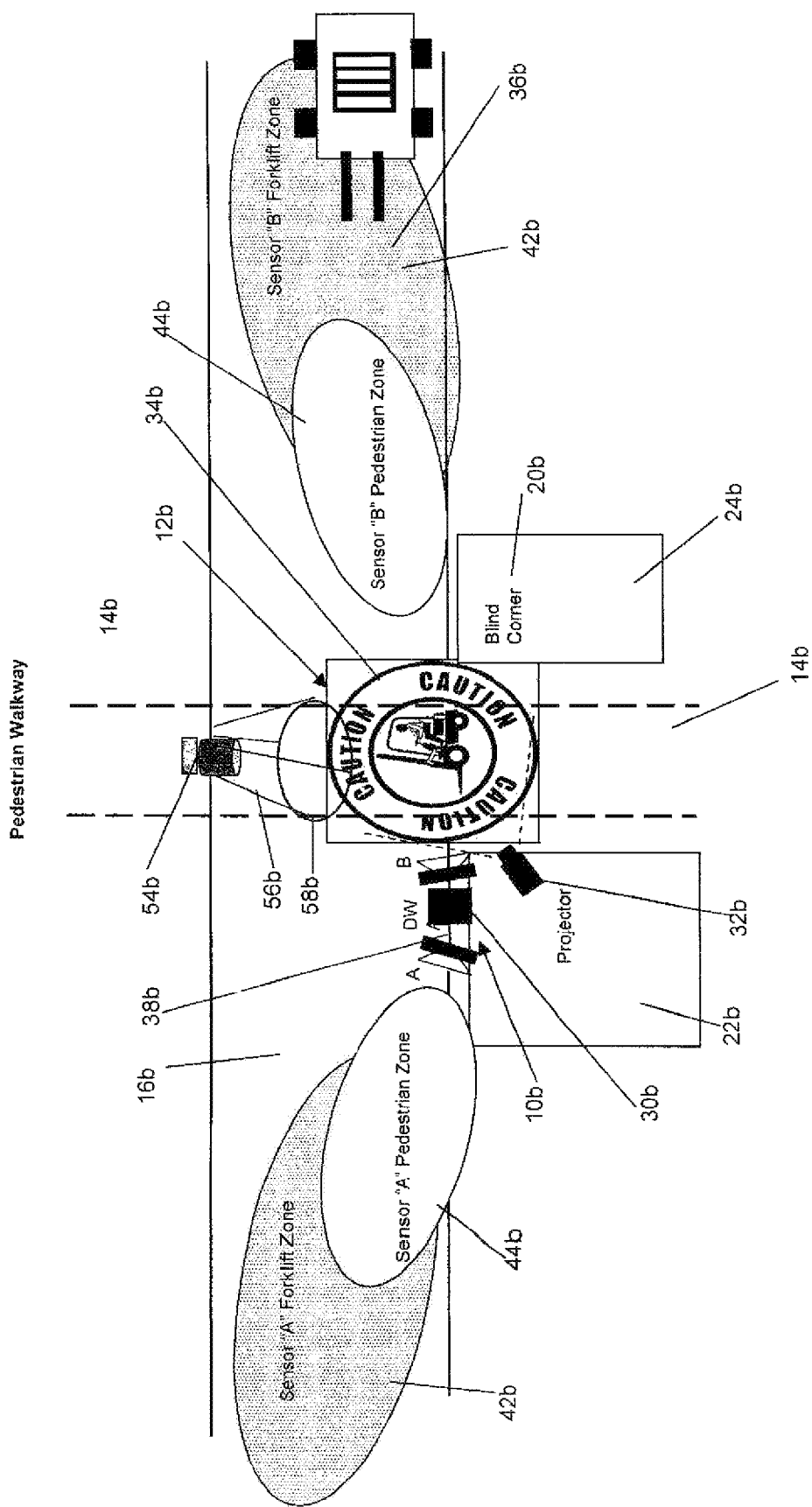
FIG. 2 is a top view diagram of a four-way intersection in which one embodiment of the invention is utilized to provide warning information to pedestrians approaching an intersection.

Although the invention has been shown and described with overlapping metal and pedestrian detection areas, it will be appreciated that these detection areas may only slightly overlap or not overlap at all. For example, FIG. 2 depicts an apparatus 10b of the invention that is positioned to detect and warn pedestrians in a pedestrian walkway 14b approaching and crossing an industrial pathway 16b at an intersection 12b through which large metal objects pass, in this example a forklift 36b. A blind corner 20b is created by obstacles 22b and 24b adjacent the intersection 12b.

The apparatus 10b includes a left-looking unitary sensor A and a right-looking unitary sensor B, a sensing system having a controller 30b, and a projector 32b. The unitary sensors A and B each have a metal detection area 42b and a pedestrian detection area 44b that only partially overlap. In this example, the relative positions f the detection areas 42b and 44b are selected to account for the normally greater travel speed of the forklift 36b compared to a pedestrian (not shown) as each type of traffic would typically move toward the intersection 12b.

It will be appreciated that the differing relative footprints and locations of the metal detection areas and pedestrian detection areas can be determined and selected depending on the structural and operational characteristics of the individual unitary sensors used, Many such sensor types can be, implemented within the contemplated invention scope provided the selected unitary sensors possess the ability to detect both metal objects and pedestrians and include an activatable pedestrian detection mode.

Figure 3:
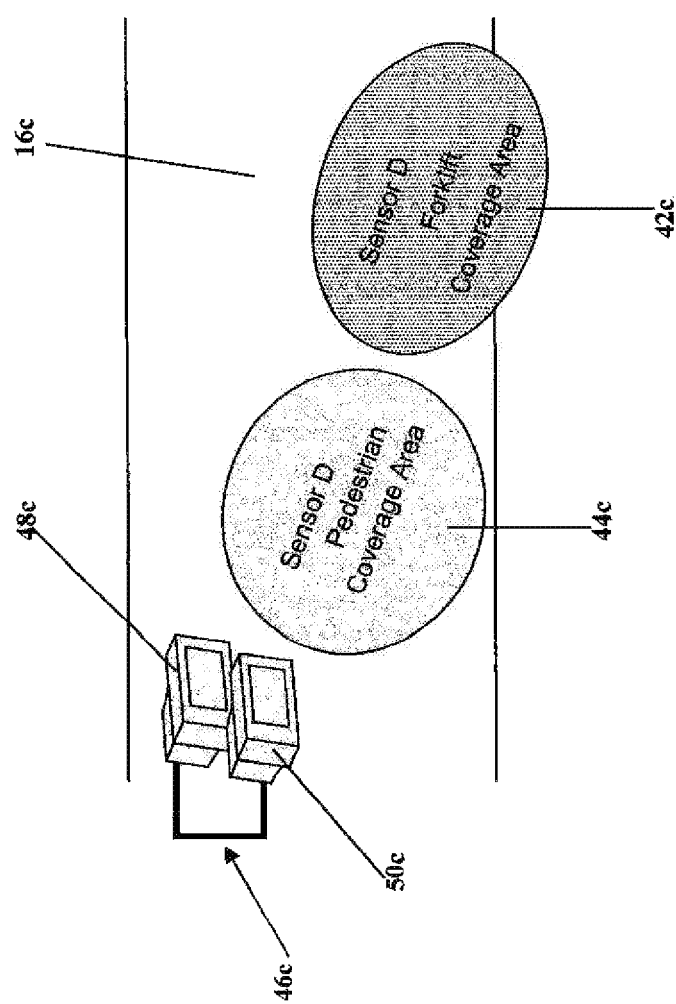
FIG. 3 is a perspective view of a unitary sensor and its respective pedestrian detection area and metal detection area according to one embodiment of the invention.

Some appropriately implemented unitary sensors can be implemented by combining two separate sensors into a single unitary sensor apparatus within the contemplated scope of the invention. For example, one appropriately implemented unitary sensor can be constructed by combining two commercially available sensors into a single unitary unit. Referring to FIG. 3, a combined unitary sensor 46c according to the invention is constructed by interwiring an upper microwave sensor subunit 48c and lower microwave sensor subunit 50c so that the combined upper and lower subunits 48c and 50c operate as a single unitary sensor 46c. In this example, each subunit 48c and 50c can be a commercially available microwave sensor such as the Hercules 2 Microwave Sensor available from Bircher Reglomat of Beringen, Switzerland, though other sensors, including those featuring long range vehicle detection, can also be utilized. Other microwave sensor types can also, be utilized to detect metal objects and sensors utilizing microwaves or other technologies can also be used to detect pedestrians within the intended scope of the invention. Such sensors should have a pedestrian sensor that includes an activatable pedestrian detection mode.

With further reference to FIG. 3, the upper sensor subunit 48c is positioned to detect when a forklift or other metal moving object enters the metal detection area 42c while moving toward the intersection (not shown in FIG. 3). The lower sensor subunit 50c is positioned to detect, when its pedestrian detection mode is actuated, when a pedestrian enters the pedestrian detection area 44c. In this example embodiment, the metal detection area 42c and pedestrian detection area 44c do not overlap.

Figure 4:
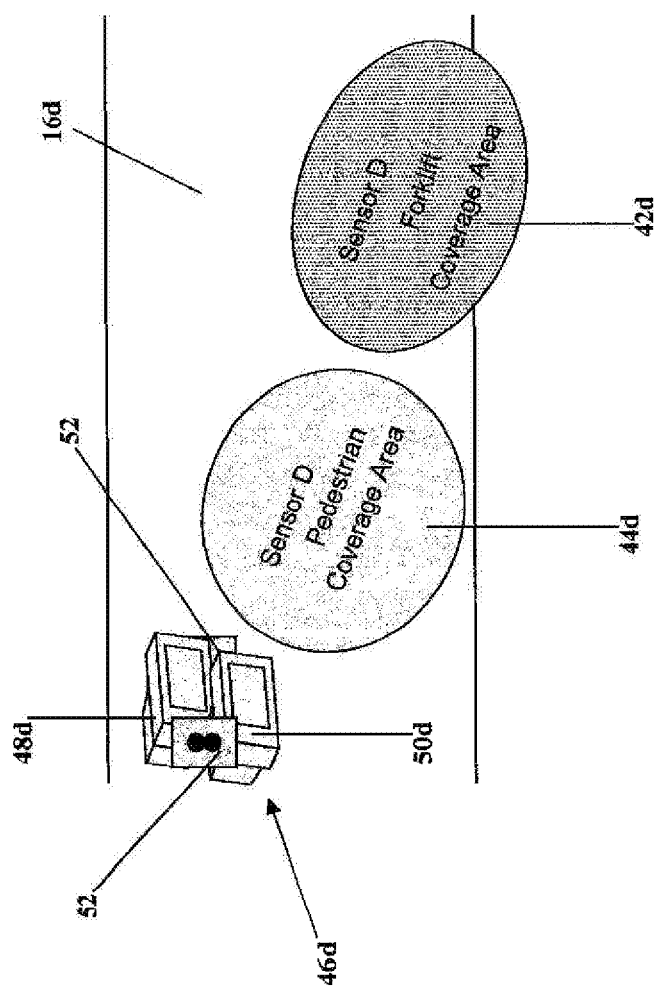
FIG. 4 is a perspective view of a unitary sensor and its respective pedestrian detection area and metal detection area according to one embodiment of the invention.

Referring now to FIG. 4, which depicts an anticipated embodiment similar to that of FIG. 3, a combined unitary sensor 46d includes an upper sensor subunit 48d and lower sensor subunit 50d coupled together with a bolt bracket 52. Such configuration allows for steady relative positioning and immobilization of the upper and lower sensor subunits 48d and 50d for alignment with the respective metal, and pedestrian detection areas 42d and 44d.

Figure 5:
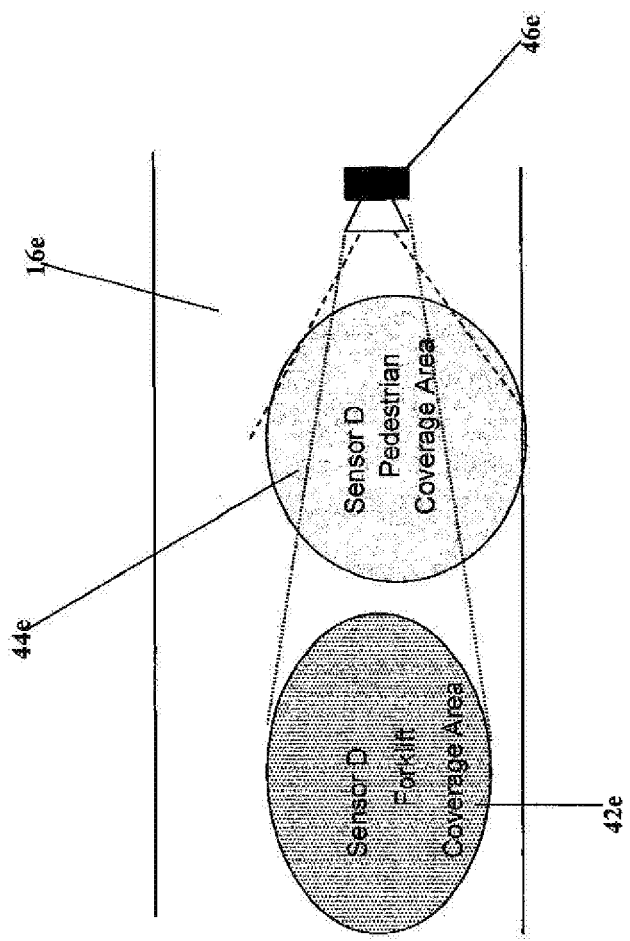
FIG. 5 is a perspective view of a unitary sensor and its respective pedestrian detection area and metal detection area according to one embodiment of the invention.

It will be further appreciated that both unitary sensors can be contained in a single commercially available device having the ability to detect metal objects and pedestrians moving toward the intersection and having an activatable pedestrian detection mode for detecting pedestrians in the pedestrian detection area. For example, FIG. 5 depicts a left-looking detector in which a single device comprises the entire unitary sensor 46e. The sensor 46e includes the ability to detect the presence of both metal objects moving toward the intersection (not shown in FIG. 5) in the metal detection area 42c and the presence of pedestrians in the pedestrian detection area 44e, neither of which overlap in this contemplated embodiment. Commercially available detectors having such capabilities and which can be appropriately implemented include the the Hercules 2S Microwave Sensor available from Bircher Reglomat of Beringen, Switzerland, though other sensors, including those featuring long range vehicle detection, can also be utilized.

Although the invention has been shown and described as using certain commercially available sensors, it will be appreciated that, other types of sensors can also be similarly implemented into the invention within the intended scope of the invention. Such sensors should be capable of detecting, with microwaves, metal objects moving through a metal detection area toward the intersection and be further capable of detecting pedestrians in a pedestrian detection area.

It is further contemplated the invention can include additional visual warning signals beyond those projected with the warning message. For example, referring again to FIG. 2, the invention can also include an additional alert beam projector 54b that is mounted on a wall or ceiling-suspended position over the intersection 12b. When a metal object enters a metal detection area 42b moving toward the intersection 12b, or when the unitary sensors A or B have their pedestrian activation modes activated and a pedestrian enters a pedestrian detection area 44b, the sensing system causes the alert beam projector 54b to project an alert beam 56 having a footprint 58 that is visible to pedestrians approaching the intersection. However, in some embodiments, the beam footprint 58 may appear at a different location in the intersection 12b than the warning signal 34b.

Although the invention has been shown and described as being used where pedestrian paths cross an industrial aisle or roadway, it will be appreciated the invention can also be appropriately implemented in the context of a multi-way intersection, where incoming traffic can be metal objects such as forklifts approaching from any direction, within the contemplated scope of the invention.

Figure 6:
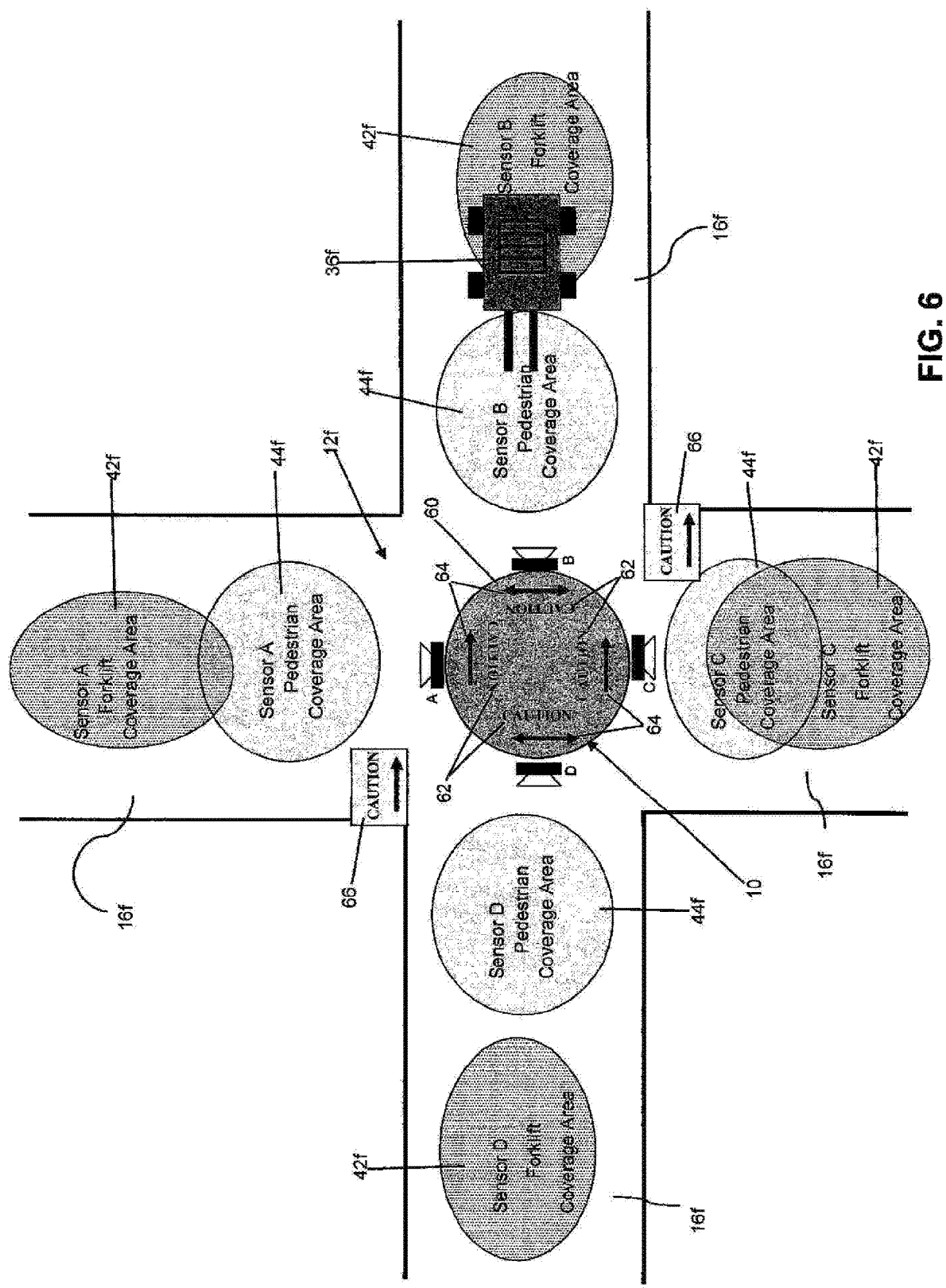
FIG. 6 is a top view diagram of a four-way intersection in which one embodiment of the invention is utilized to provide warning information to pedestrians approaching an intersection.

For example, FIG. 6 depicts a four-way intersection 12f in which the pathways 16f represent four separate intersection approaches. An apparatus 19f of the invention includes a controller (not shown) and projector (not shown) located within a dome 60 suspended above the intersection 12f. The dome 60, which can be a mirrored dome, also positions four unitary sensors A, B, C, and D, each of which is positioned to detect the presence of metal objects entering respective metal detection areas 42f and approaching the intersection 12f. When a metal object, such as the forklift 36f, is detected entering a metal detection area 42f and approaching the intersection 12f by any one or more of the of the unitary sensors A, B, C, and/or D, the sensing system causes illuminated caution messages 62 to light up, along with illuminated direction indicators 64 which are arrows indicating the direction from which the forklift 36f is approaching the intersection 12f. It will be appreciated the invention can also include externally positioned warning signs 66 located along the aisles 16f or otherwise located remotely from the unitary sensors A, B, C, and D. The warning signs 66 are also controlled by the controller of the sensing system and contain warning and direction information visible to pedestrians walking along the aisles 16f or in the intersection 12f.

Figure 7:
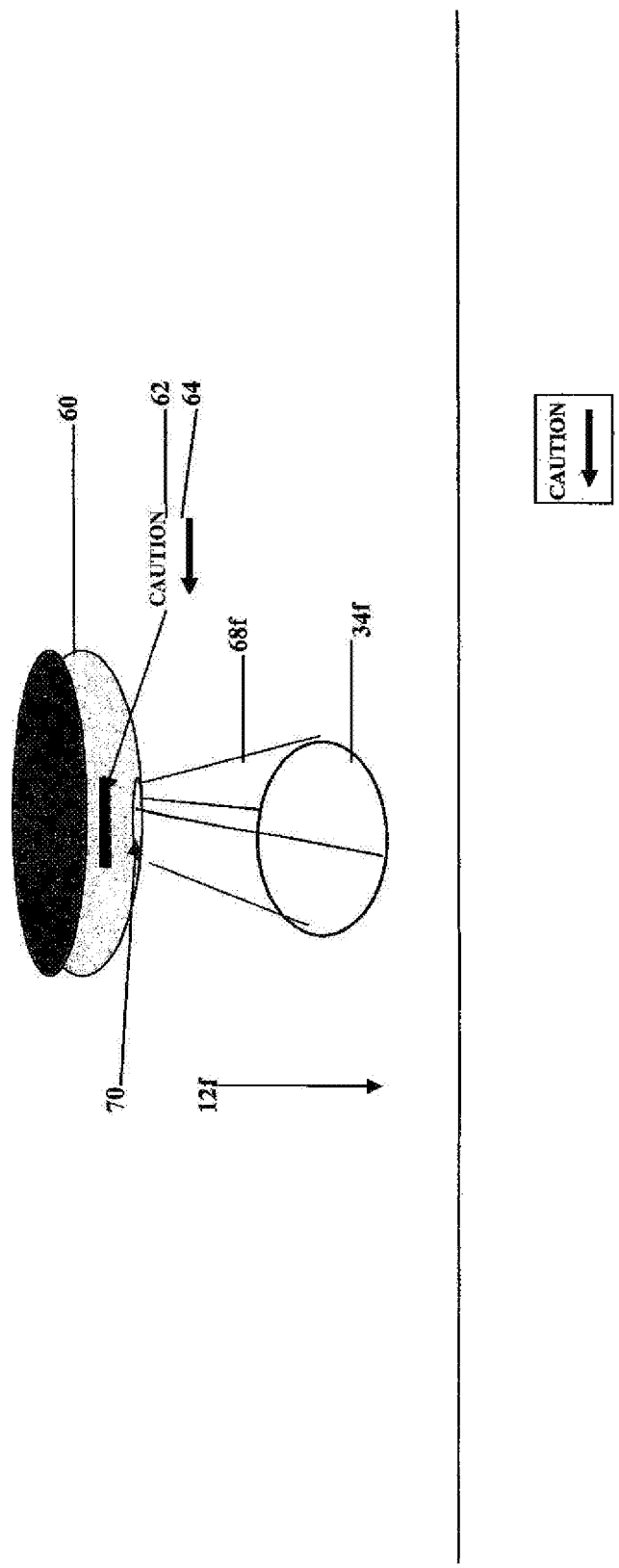
FIG. 7 is a side perspective view of a warning message being projected into an intersection by a projector located inside a dome suspended above an intersection according to one embodiment of the invention.

Referring briefly to FIG. 7, which includes a side view of the dome 60 of FIG. 6, the sensing system also causes the projector (not shown), in response to the sensor detection of the forklift 36f moving toward the intersection 12f, to project a warning message 34f into the intersection 12f from within the dome 60. The projector beam 68 can pass through the dome through a demirrored area 70 of the dome that can be a portion of the dome with removed metallization. It will be further appreciated that in some embodiments, the warning signal 34 can instead be an alert beam similar to the alert beam 56b of the embodiment shown and described in FIG. 2 within the contemplated scope of the invention. Comparing FIGS. 2, 6, and 7, it will also be appreciated that in still further embodiments, a combination of alert beams and warning signals can be appropriately implemented within the contemplated invention scope.

Each of the unitary sensors A, B, C, and D also has an activatable pedestrian detection mode. When the pedestrian detection mode is not activated, none of the unitary sensors will detect nor responsively cause the sensing system to illuminate any of the caution messages 62, direction indicators 64, external warning signs 66, or cause the projector to project a warning signal 34f into the intersection 12f based on the presence of a pedestrian entering into one of the pedestrian coverage areas 44f. However, when the pedestrian detection modes of the unitary sensors A, B, C, and D are activated, the sensing system will cause each of the caution messages 62, direction indicators 64, and external warning signs 66 to illuminate and cause the projector to project a warning signal 34f into the intersection 12f when a pedestrian is detected entering into one of the pedestrian detection areas 44f.

It will be appreciated that the invention is contemplated to be usable with and compatible with other warning devices. Those skilled in the art will also realize that this invention is capable of embodiments different from those shown and described. It will be appreciated that the detail of the structure of this apparatus and methodology can be changed in various ways without departing from the scope of this invention. Accordingly, the drawing and detailed description are to be regarded as including such equivalents as do not depart from the scope of the invention.

The invention claimed is:

1. An apparatus for detecting and for warning pedestrian traffic approaching an intersection comprising:
    a sensing system for controlling a projector and for identifying traffic crossing at the intersection, said sensing system having a first unitary sensor and a second unitary sensor, each of said first unitary sensor and said second unitary sensor being capable of detecting a pedestrian and a moving metal object, each of said first unitary sensor and said second unitary sensor having an activatable pedestrian detection mode;
    said first unitary sensor being positioned to detect, with microwaves, the moving metal object approaching the intersection from a first direction when the moving metal object enters a first metal detection area, said second unitary sensor being positioned to detect, with microwaves, the moving metal object approaching the intersection from a second direction when the moving metal object enters a second metal detection area;
    said first unitary sensor being positioned to detect the pedestrian approaching the intersection from a first direction when the pedestrian enters a first pedestrian detection area, said second unitary sensor being positioned to detect the pedestrian approaching the intersection from, a second direction when the pedestrian enters a second pedestrian detection area;
    said sensing system being responsive to said first unitary sensor d said second unitary sensor;
    said sensing system causing said projector to project a warning message into or near said intersection when said first unitary sensor senses the moving metal object enter into said first metal detection area and in a direction that is toward the intersection, said sensing system causing said projector to project a warning message into or near said intersection when said second unitary sensor senses the moving metal object enter into said second metal detection area and in a direction that is toward the intersection, said warning message being visible to pedestrians walking toward the intersection; and
    said sensing system causing said projector to project a warning message into or near said intersection when said pedestrian detection mode of said first unitary sensor is activated and said first unitary sensor senses the pedestrian entering into said first pedestrian detection area, said sensing system causing said, projector to project a warning message into or near said intersection when said pedestrian detection mode of said second unitary sensor is activated and said second unitary sensor senses the pedestrian entering into said second pedestrian detection area, said warning message being visible to pedestrians walking toward the intersection.

2. The apparatus of claim 1 wherein said moving metal object is a forklift.

3. The apparatus of claim 1 further comprising an illuminated warning sign, said illuminated warning sign being responsive to said sensing system and located at a position that is visible to pedestrians walking toward the intersection, said sensing system causing said warning sign to illuminate when said first unitary sensor or said second unitary sensor senses the moving metal object enter into said first metal detection area or said second metal detection area.

4. The apparatus of claim 1 wherein said warning message is a rotating message.

5. The apparatus of claim 1 wherein at least one of said first unitary sensor and said second unitary sensor are positioned by a dome that is suspended over the intersection.

6. The apparatus of claim 1 wherein at least one of said first unitary sensor and said second unitary sensor are positioned by a dome that is suspended over the intersection, said sensing system causing at least one illuminated warning message within said dome to illuminate when at least one of said first unitary sensor and said second unitary sensor senses a moving metal object entering into said first metal detection area or said second metal detection area, said warning message being visible to pedestrians walking toward the intersection.

7. The apparatus of claim 1 further comprising an alert beam projector that is responsive to said sensing system, said sensing system causing said alert beam projector to project an alert beam into or near the intersection when at least one of said first unitary sensor or said second, unitary sensor senses the moving metal object entering into said first metal detection area or said second metal detection area, said alert beam being visible to pedestrians walking toward the intersection.

8. The apparatus of claim 1 wherein said first unitary sensor detects with microwaves when the pedestrian enters said first pedestrian detection area, said second unitary sensor detects with microwaves when the pedestrian enters said second pedestrian detection area.

9. The apparatus of claim 1 wherein said sensing system does not responsively cause said projector to project a warning message into or near said intersection if a metal object is detected to be moving in a direction that is not toward said intersection.

10. An apparatus for detecting and for warning pedestrian traffic approaching an intersection comprising:

a sensing system for controlling a projector and for identifying traffic crossing at the intersection, said sensing system having a first unitary sensor and a second unitary sensor, each of said first unitary sensor and said second unitary sensor being capable of detecting a pedestrian and a moving metal object, each of said first unitary sensor and said second unitary sensor having an activatable pedestrian detection mode;

said first unitary sensor being positioned to detect, with microwaves, the moving metal object approaching the intersection from a first direction when the moving metal object enters a first metal detection area, said second unitary sensor being positioned to detect, with microwaves, the moving metal object approaching the intersection from a second direction when the moving metal object enters a second metal detection area;

said first unitary sensor being positioned to detect the pedestrian approaching the intersection from a first direction when the pedestrian enters a first pedestrian detection area, said second unitary sensor being positioned to detect the pedestrian approaching the intersection from a second direction when the pedestrian enters a second pedestrian detection area;

said sensing system being responsive to said first unitary sensor and said second unitary sensor;

said sensing system causing said projector to project a warning message into or near said intersection and a secondary arrow signal pointing toward said first metal detection area when said first unitary sensor senses the moving metal object entering into said first metal detection area and in a direction that is toward the intersection, said sensing system causing said projector to project a warning message into or near said intersection and a secondary arrow signal pointing toward said second metal detection area when said second unitary sensor senses the moving metal object entering into said second metal detection area and in a direction that is toward the intersection, said warning message and said secondary arrow signal being visible to pedestrians walking toward the intersection; and said sensing system causing said projector to project a warning message into or, near said intersection when said pedestrian detection mode of said first unitary sensor is activated and first unitary sensor senses the pedestrian entering into said first pedestrian detection area, said sensing system causing said projector to project a warning message into or near said intersection when said pedestrian detection mode of said second unitary sensor is activated and said second unitary sensor senses the pedestrian entering into said second pedestrian detection area, said warning message being visible to pedestrians walking toward the intersection.

11. The apparatus of claim 10 wherein said moving metal object is a forklift.

12. The apparatus of claim 10 further comprising an illuminated warning sign, said illuminated warning sign being responsive to said sensing system and located at a position that is visible to pedestrians walking toward the intersection, said sensing system causing said warning sign to illuminate when said first unitary sensor or said second unitary sensor senses the moving metal object enter into said first metal detection area or said second metal detection area.

13. The apparatus of claim 10 wherein said warning message is a rotating message.

14. The apparatus of claim 10 wherein at least one of said first unitary sensor and said second unitary sensor are positioned by a dome that is suspended over the intersection.

15. The apparatus of claim 10 wherein at least one of said first unitary sensor and said second unitary sensor are positioned by a dome that is suspended over the intersection, said sensing system causing at least one illuminated warning message within said dome to illuminate when at least one of said first unitary sensor and said second unitary sensor senses a moving metal object entering into said first metal detection area or said second metal detection area, said warning message being visible to pedestrians walking toward the intersection.

16. The apparatus of claim 10 further comprising an alert beam projector that is responsive to said sensing system, said sensing system causing said alert beam projector to project an alert beam into or near the intersection when at least one of said first unitary sensor or said second unitary sensor senses the moving metal object entering into said first metal detection area or said second metal detection area, said alert beam being visible to pedestrians walking toward the intersection.

17. The apparatus of claim 10 wherein said first unitary sensor detects with microwaves when the pedestrian enters said first pedestrian detection area, said second unitary sensor detects with microwaves when the pedestrian enters said second pedestrian detection area.

18. The apparatus of claim 10 wherein said sensing system does not responsively cause said projector to project a warning message into or near said intersection if a metal object is detected to be moving, in a direction that is not toward said intersection.

19. An apparatus for detecting and for warning pedestrian traffic approaching an intersection comprising:

a sensing system for controlling a projector and for identifying traffic crossing at the intersection, said sensing system having a first unitary sensor, a second unitary sensor, a third unitary sensor, and a fourth unitary sensor, each of said first, second, third, and fourth unitary sensors being capable of detecting a pedestrian and a moving metal object, each of said first, second, third, and fourth unitary sensors having an activatable pedestrian detection mode;

said first unitary sensor being positioned to detect, with microwaves, the moving metal object approaching the intersection from a first direction when the moving metal object enters a first metal detection area, said second unitary sensor being positioned to detect, with microwaves, the moving metal object approaching the intersection from a second direction when the moving metal object enters a second metal detection area, said third unitary sensor being positioned to detect, with microwaves, the moving metal object approaching the intersection from a third direction when the moving metal object enters a third metal detection area, said fourth unitary sensor being positioned to detect, with microwaves, the moving, metal object approaching the intersection from a fourth direction when the moving metal, object enters a fourth metal detection area;

said first unitary sensor being positioned to detect the pedestrian approaching the intersection from a first direction when the pedestrian enters a first pedestrian detection area, said second unitary sensor being positioned to detect the pedestrian approaching, the intersection from a second direction when the pedestrian enters a second pedestrian detection area, said third unitary sensor being positioned to detect the pedestrian approaching the intersection from a third direction when the pedestrian enters a third pedestrian detection area, said fourth unitary sensor being positioned to detect the pedestrian approaching the intersection from a fourth direction when the pedestrian enters a fourth pedestrian detection area;

said sensing system being responsive to said first, second, third, and fourth unitary sensors;

said sensing system causing said projector to project a warning message into or near said intersection when said first unitary sensor senses the moving metal object enter into said first metal detection area and in a direction that toward the intersection, said sensing system causing said projector to project a warning message into or near said, intersection when said second unitary sensor senses the moving, metal object enter into said second, metal detection area and in a direction that is toward the intersection, said sensing system causing said projector to project a warning message into or near said intersection when said third unitary sensor senses the moving metal object enter into said third metal detection area and in a direction that is toward the intersection, said sensing system causing said projector to project a warning message into or near said intersection when said fourth unitary sensor senses the moving metal object enter into said fourth metal detection area and in a direction that is toward the intersection, said warning message being visible to pedestrians walking toward the intersection; and said sensing system causing said projector to project a warning message into or near said intersection when said pedestrian detection, mode of said first unitary sensor is activated and said first unitary sensor senses the pedestrian enter into said first pedestrian detection area, said sensing system causing said projector to project a warning, message into or near said intersection when said pedestrian detection mode of said second unitary sensor is activated and said second unitary sensor senses the pedestrian enter into said second pedestrian detection area, said sensing system causing said projector to project a warning message into or near said intersection when said pedestrian detection mode of said third unitary sensor is activated and said third unitary sensor senses the pedestrian enter into said third pedestrian detection area, said sensing system causing said projector to project a warning message into or near said intersection when said pedestrian detection mode of said fourth unitary sensor is activated and said fourth unitary sensor senses the pedestrian enter into said fourth, pedestrian detection area, said warning message from said projector being visible to pedestrians walking toward the intersection.

20. The apparatus of claim 19 wherein said moving metal object is a forklift.

21. The apparatus of claim 19 further comprising an illuminated warning sign, said illuminated warning sign being responsive to said sensing system and located at a position that is visible to pedestrians walking toward the intersection, said sensing system causing said warning sign to illuminate when said first unitary sensor or said second unitary sensor senses the moving metal object enter into said first metal detection area or said second metal detection area.

22. The apparatus of claim 19 wherein said warning message is a rotating message.

23. The apparatus of claim 19 wherein at least one of said first unitary sensor, said second unitary sensor, said third unitary sensor, and said fourth unitary sensor are positioned by a dome that is suspended over the intersection.

24. The apparatus of claim 19 wherein at least one of said first, second, third, and fourth unitary sensors are positioned by a dome that is suspended over the intersection, said sensing system causing at least one illuminated warning message within said dome to illuminate when at least one of said first, second, third, and fourth unitary sensors senses a moving metal object entering into said first, second, third, or fourth metal detection areas, said warning message being visible to pedestrians walking toward the intersection.

25. The apparatus of claim 19 further comprising an alert beam projector that is responsive to said, sensing system, said sensing system causing said alert beam projector to project an alert beam into or near the intersection when at least one of said first, second, third, or fourth unitary sensors senses the moving metal object entering into said first, second, third, Or fourth metal detection areas, said alert beam being visible to pedestrians walking toward the intersection.

26. The apparatus of claim 19 wherein said first unitary sensor detects with microwaves when the pedestrian enters said first pedestrian detection area, said second unitary sensor detects with microwaves when the pedestrian enters said second pedestrian detection area, said third unitary sensor detects with microwaves when the pedestrian enters said third pedestrian detection area, and said fourth unitary sensor detects with microwaves when the pedestrian enters said fourth pedestrian detection area.

27. The apparatus of claim 19 wherein said sensing system does not responsively cause said projector to project a warning message into or near said intersection if a metal object is detected to be moving in a direction that is not toward said intersection.

28. An intersection arrangement comprising:
an aisle or roadway, said aisle or roadway allowing for the movement of forklifts and pedestrians along the length of said aisle or roadway;
a pedestrian walkway, said pedestrian walkway meeting and intersecting said aisle or roadway at an intersection located at a point along the length of said aisle or roadway;
an apparatus for detecting and for warning pedestrian traffic approaching said intersection comprising:
a sensing system for controlling a projector and for identifying traffic crossing at the intersection, said sensing system having a first unitary sensor and a second unitary sensor, each of said first unitary sensor and said second unitary sensor being capable of detecting a pedestrian and a moving metal object, each of said first unitary sensor and said second unitary sensor having an activatable pedestrian detection mode;

said first unitary sensor being positioned to detect, with microwaves, the moving metal object approaching the intersection from a first direction when the moving metal object enters a first metal detection area, said second unitary sensor being positioned to detect, with microwaves, the moving metal object approaching the intersection from a second direction when the moving metal object enters a second metal detection area;

said first unitary sensor being positioned to detect the pedestrian approaching the intersection from a first direction when the pedestrian enters a first pedestrian detection area, said second unitary sensor being positioned to detect the pedestrian approaching the intersection, from a second direction when the pedestrian enters a second pedestrian detection area;

said sensing system being responsive to said first unitary sensor and said second unitary sensor;

said sensing system causing said projector to project a warning message into or near said intersection when said first unitary sensor senses the moving metal object enter into said first metal detection area and in a direction that toward the intersection, said sensing system causing said projector to project a warning message into or near said intersection when said second unitary sensor senses the moving metal object enter into said second metal detection area and in a direction that is toward the intersection, said warning message being visible to pedestrians walking toward the intersection; and said, sensing system causing said projector to project a warning message into or near said intersection when said pedestrian detection mode and said first unitary sensor is activated and said first unitary sensor senses the pedestrian entering into said first pedestrian detection area, said sensing system causing said projector to project a warning message into or near said intersection when said pedestrian detection mode of said second unitary sensor is activated and said second unitary sensor senses the pedestrian entering into said second pedestrian detection area, said warning message being visible to pedestrians walking toward the intersection.

29. The intersection arrangement of claim 28 wherein said moving metal object is a forklift.

30. The intersection arrangement of claim 28 further comprising an illuminated warning sign, said illuminated warning sign being responsive to said sensing system and located at a position that is visible to pedestrians walking toward the intersection, said sensing system causing said warning sign to illuminate when said first unitary sensor or said second unitary sensor senses the moving metal object enter into said first metal detection area or said second metal detection area.

31. The intersection arrangement of claim 28 wherein said warning message is a rotating message.

32. The intersection arrangement of claim 28 wherein at least one of said first unitary sensor and said second unitary sensor are positioned by a dome that is suspended over the intersection.

33. The intersection arrangement of claim 28 wherein at least one of said first unitary sensor and said second unitary sensor are positioned by a dome that is suspended over the intersection, said sensing system causing at least one illuminated warning message within said, dome to illuminate when at least one of said first unitary sensor and said second unitary sensor senses a moving metal object entering into said first metal detection area or said second metal detection area, said warning message being visible to pedestrians walking toward the intersection.

34. The intersection arrangement of claim 28 further comprising an alert beam projector that is responsive to said sensing system, said sensing system causing said alert beam projector to project an alert beam into, or near the intersection when at least one of said first unitary sensor or said second unitary sensor senses the moving metal object entering into said first metal detection area or said second metal detection area, said alert beam being visible to pedestrians walking toward the intersection.

35. The intersection arrangement of claim 28 wherein said first unitary sensor detects with microwaves when the pedestrian enters said first pedestrian detection area, said second unitary sensor detects with microwaves when the pedestrian enters said second pedestrian detection area.

36. The intersection arrangement of claim 28 wherein said sensing system does not responsively cause said projector to project a warning message into or near said intersection if a metal object is detected to be moving in a direction that is not toward said intersection.

37. A method for detecting and for warning pedestrian traffic approaching an intersection comprising:

providing a sensing system for controlling a projector and for identifying traffic crossing at the intersection, said sensing system having a first unitary sensor and a second unitary sensor, each of said first unitary sensor and said, second unitary sensor being capable of detecting a pedestrian and a moving metal object, each of said first unitary sensor and said second unitary sensor having an activatable pedestrian detection mode;

positioning said first unitary sensor to detect, with microwaves, the moving metal object approaching the intersection from a first direction when the moving metal object enters a first metal detection area, positioning said second unitary sensor to detect, with microwaves, the moving metal object approaching the intersection from a second direction when the moving metal object enters a second metal detection area;

positioning said first unitary sensor to detect the pedestrian approaching the intersection from a first direction when the pedestrian enters a first pedestrian detection area, positioning said second unitary sensor to detect the pedestrian approaching the intersection from a second direction when the pedestrian enters a second pedestrian detection area, said sensing system being responsive to said first unitary sensor and said second unitary sensor;

causing said sensing system to project with said projector a warning message into or near said intersection when said first unitary sensor senses the moving metal object entering into said first metal detection area and in a direction that is toward the intersection, causing said sensing system to project with said projector a warning message into or near said intersection when said second unitary sensor senses the moving metal object enter into said second metal detection area and in a direction that is toward the intersection, said warning message projected to be visible to pedestrians walking toward the intersection;

activating said pedestrian detection mode of said first unitary sensor to cause said sensing system to cause said projector to project a warning message into or near said intersection when, said pedestrian detection mode and said first unitary sensor is activated and said first unitary sensor senses the pedestrian entering into said first pedestrian detection area, activating said pedestrian detection mode of said second unitary sensor to cause said sensing system to cause said projector to project a warning message into or near said intersection when said pedestrian detection mode of said second unitary sensor is activated and said second unitary sensor senses the pedestrian entering into said second pedestrian detection area, said warning message being visible to pedestrians walking toward the intersection.

38. The method of claim 37 wherein said moving metal object is a forklift.

39. The method of claim 37 further comprising providing an illuminated warning sign that is responsive to said sensing system and located at a position that is visible to pedestrians walking toward the intersection, and causing with said sensing system said warning sign to illuminate when said first unitary sensor or said second unitary sensor senses the moving metal object enter into said first metal detection area or said second metal detection area.

40. The method of claim 37 wherein said warning message is a rotating message.

41. The method of claim 37 wherein at least one of said first unitary sensor and said second unitary sensor are positioned by a dome that is suspended over the intersection.

42. The method, of claim 37 further comprising positioning at least one of said first unitary sensor and said second unitary sensor with a dome and suspending said dome over the intersection, causing said sensing system to illuminate a warning message within said dome to illuminate when at least one of said first unitary sensor and, said second unitary sensor senses a moving metal object entering into said first metal detection area or said second metal detection area, said warning message being, visible to pedestrians walking toward the intersection.

43. The method of claim 37 further comprising providing an alert beam projector that is responsive to said sensing system, causing with said sensing system said alert beam projector to project an alert beam into or near the intersection when at least one of said first unitary sensor or said second unitary sensor senses the moving metal object entering into said first metal detection area or said second metal detection area, said alert beam being visible to pedestrians walking toward the intersection.

44. The method of claim 37 further comprising using microwaves to detect with said first unitary sensor when the pedestrian enters said first pedestrian detection area, using microwaves to detect with said second unitary sensor when the pedestrian enters said second pedestrian detection area.

45. The method of claim 37 wherein said sensing system does not responsively cause said projector to project a warning message into or near said intersection if a metal object is detected to be moving in a direction that is not toward said intersection.

* * * * *